United States Patent
Lockwood (10) Patent No.: US 10,073,654 B1
(45) Date of Patent: Sep. 11, 2018

(54) IMAGE FORMING OPERATION MONITORING SYSTEMS AND METHODS

(71) Applicant: KYOCERA Document Solutions Inc., Osaka (JP)

(72) Inventor: Edwin Philip Lockwood, El Segundo, CA (US)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 15/835,760

(22) Filed: Dec. 8, 2017

(51) Int. Cl.
   *G06F 3/06* (2006.01)
   *G06F 3/00* (2006.01)
   *G06F 3/12* (2006.01)
   *H04N 1/00* (2006.01)

(52) U.S. Cl.
   CPC ........... *G06F 3/0653* (2013.01); *G06F 3/122* (2013.01); *G06F 3/1236* (2013.01); *G06F 3/1278* (2013.01); *G06F 3/1294* (2013.01); *H04N 1/00954* (2013.01); *H04N 2201/0094* (2013.01)

(58) Field of Classification Search
   CPC ...... G06F 3/0653; G06F 3/122; G06F 3/1236; G06F 3/1278; G06F 3/1294; G06F 3/00954; G06F 3/0094
   USPC ....................................................... 358/1.15
   See application file for complete search history.

(56) References Cited

U.S. PATENT DOCUMENTS

| | | | | |
|---|---|---|---|---|
| 2008/0259397 | A1* | 10/2008 | Uehara | H04N 1/00244 358/1.15 |
| 2014/0185087 | A1* | 7/2014 | Hayashi | G06F 3/122 358/1.15 |
| 2014/0218765 | A1 | 8/2014 | Sawayanagi et al. | |
| 2016/0307142 | A1* | 10/2016 | Prabhakara | G06Q 10/063114 |
| 2017/0195513 | A1* | 7/2017 | Yamaguchi | H04N 1/32117 |

\* cited by examiner

*Primary Examiner* — Allen H Nguyen
(74) *Attorney, Agent, or Firm* — McDonnell Boehnen Hulbert & Berghoff LLP (57) ABSTRACT

Example systems and related methods may relate to monitoring performance of an image forming operation. Namely, a system may include an image forming apparatus configured to execute an operation. The system further includes an external sensor circuit comprising one or more sensors and a processor. The system yet further includes a host computing device configured to generate, in response to receiving notifications of a status of the operational parameter received from the one or more processors of the sensor circuit, a first timestamp indicative of when the image forming apparatus started to execute the printing operation, and a second timestamp indicative of when the image forming apparatus completed the printing operation. The host computing device is further configured to generate a log file. Data of the log file includes the first timestamp and the second timestamp, and is indicative of how quickly the image forming apparatus executed the operation.

20 Claims, 11 Drawing Sheets

IMAGE FORMING OPERATION MONITORING SYSTEMS AND METHODS

BACKGROUND

Image forming apparatuses have become increasingly proficient at performing various operations, such as printing, copying, scanning, or faxing operations. To determine whether a new image forming apparatus is performing operations more quickly than previously designed devices, or whether an existing image forming apparatus is continuing to perform up to desired standards, the image forming apparatus may be monitored as it performs operations.

In some cases, image forming apparatuses may alert another device of an operational status of the image forming apparatus to indicate that it has performed, or is performing, an operation. However, not all image forming apparatuses are configured to supply such information, and different devices may supply this information in different ways, or at different times.

SUMMARY

In a first aspect, a method is provided. The method includes receiving, by an image forming apparatus, instructions to execute an operation of the image forming apparatus. The method further includes, in response to receiving the instructions, executing, by the image forming apparatus, the operation. The method yet further includes detecting, by an external sensor circuit, a status of an operational parameter of the image forming apparatus indicative of the image forming apparatus executing the operation. The method additionally includes sending, by the external sensor circuit, notifications of the status of the operational parameter to a host computing device. The method also includes generating, in response to receiving the notifications of the status of the operational parameter, by the host computing device, a first timestamp indicative of when the image forming apparatus started to execute the printing operation, and a second timestamp indicative of when the image forming apparatus completed the printing operation. The method still further includes evaluating a performance level of the image forming apparatus by comparing an elapsed time between the first timestamp and second timestamp to an expected operation execution time.

In a second aspect, a system is provided. The system includes an image forming apparatus configured to execute an operation in response to receiving instructions to execute the operation. The system further includes an external sensor circuit comprising one or more sensors and a processor. The one or more sensors are configured to detect a status of an operational parameter of the image forming apparatus indicative of the image forming apparatus executing the operation, and the processor is configured to send notifications of the status of the operational parameter. The system yet further includes a host computing device, wherein the host computing device is configured to generate, in response to receiving the notifications of the status of the operational parameter, a first timestamp indicative of when the image forming apparatus started to execute the printing operation, and a second timestamp indicative of when the image forming apparatus completed the printing operation. The host computing device is further configured to generate a log file. Data of the log file includes the first timestamp and the second timestamp, and is indicative of how quickly the image forming apparatus executed the operation.

In a third aspect, a non-transitory computer-readable medium having instructions stored thereon is included. Upon execution by at least one processor, the instructions cause an image forming operation monitoring system to perform steps. The steps include receiving, by an image forming apparatus, instructions to execute an operation of the image forming apparatus. The steps further include, in response to receiving the instructions, executing, by the image forming apparatus, the operation. The steps yet further include detecting, by an external sensor circuit, a status of an operational parameter of the image forming apparatus indicative of the image forming apparatus executing the operation. The steps additionally include sending, by the external sensor circuit, notifications of the status of the operational parameter to a host computing device. The steps also include generating, in response to receiving the notifications of the status of the operational parameter, by the host computing device, a first timestamp indicative of when the image forming apparatus started to execute the printing operation, and a second timestamp indicative of when the image forming apparatus completed the printing operation. The steps still further include evaluating a performance level of the image forming apparatus by comparing an elapsed time between the first timestamp and second timestamp to an expected operation execution time.

In a fourth aspect, a system is provided that includes means for monitoring an image forming operation. The system includes means for receiving instructions to execute an operation of the image forming apparatus. The method further includes means for, in response to receiving the instructions, executing the operation. The method yet further includes means for detecting a status of an operational parameter of the image forming apparatus indicative of the image forming apparatus executing the operation. The method additionally includes means for sending notifications of the status of the operational parameter to a host computing device. The method also includes means for generating, in response to receiving the notifications of the status of the operational parameter, a first timestamp indicative of when the image forming apparatus started to execute the printing operation, and a second timestamp indicative of when the image forming apparatus completed the printing operation. The method still further includes means for evaluating a performance level of the image forming apparatus by comparing an elapsed time between the first timestamp and second timestamp to an expected operation execution time.

Other aspects, embodiments, and implementations will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Image forming apparatuses may perform a plurality of operations, such as printing, copying, scanning, or faxing operations. In performing each such operation, an image forming apparatus may receive instructions to perform the operation, and, in response, may perform the operation.

Various factors, such as network connectivity, received operation data, ink usage, or other factors may affect the time it takes the image forming apparatus to perform the operation. For example, poor network connectivity may negatively affect the time it takes the image forming apparatus to receive printing data, and thus cause the image forming apparatus to perform a printing operation slowly. As another example, the image forming apparatus may receive a large amount of printing, copying, scanning, or fax data, causing the image forming apparatus to perform the operation slowly. As yet another example, the image forming apparatus may receive printing or copying data that requires the image forming apparatus to use a large quantity of ink, causing the image forming apparatus to perform the operation slowly.

To determine whether the image forming apparatus is performing an operation satisfactorily, an image forming apparatus provider, or an image forming apparatus user, may monitor the image forming apparatus to determine how quickly the image forming apparatus performs the operation. The image forming apparatus provider or user may compare the time the image forming apparatus takes to perform the apparatus to an expected performance time. For example, an image forming apparatus provider may test the performance of an image forming apparatus by sending a plurality of print jobs to the image forming apparatus, and may use a stop watch to determine how quickly the image forming apparatus prints the print jobs. In another example, an image forming apparatus user may rely on anecdotal evidence of the performance times of the image forming apparatus. Determining the performance level of an image forming apparatus in such a manual or arbitrary fashion may waste time and money, and may inaccurately or inconsistently represent how quickly the image forming apparatus performs various tasks.

Systems and methods are disclosed herein that provide efficient, accurate, and consistent means of monitoring an image forming apparatus to determine operation performance times of image forming apparatuses. It should be understood that instructions to perform image forming operations such as printing, copying, scanning, or faxing operations may be divided into any number of pages, frames, slides, sections, words, or images. As such, an expected performance time of the image forming operation may be contextual, and different types of image forming operations may be measured or evaluated differently. Further, though printing, copying, scanning, and faxing operations are discussed herein, other types of image forming operations may be measured and evaluated using the systems and methods described.

In an example scenario, an image forming apparatus provider may evaluate the performance of printing operations of an image forming apparatus that has received a software update. Evaluating the performance times may allow the image forming apparatus provider to determine whether the software update has resulted in shorter printing times, or whether new errors arise as a result of the software update. In other words, one potential use of the systems and methods described herein is to troubleshoot software updates on an image forming apparatus. It should be understood that, in other examples, the systems and methods described may be used for other purposes.

To evaluate the printing operations, the image forming apparatus provider may send printing operation instructions to the image forming apparatus. For example, a host computing device may send the instructions to the image forming apparatus. The instructions may be substantially identical to instructions sent to the image forming apparatus prior to installation of the software update. Further, the provider may possess a record of the performance of the printing operation instructions by the image forming apparatus prior to the software update. Such a record may be stored on the host computing device. The record may take the form of, for example, a log file generated by the host computing device as the image forming apparatus performed the printing operation.

In response to receiving the instructions, the image forming apparatus may perform the operation. For purposes of the present example, the software update may result in a slightly slower (i.e. worse) performance time than that recorded prior to the software update.

One or more sensors external to the image forming apparatus may be used to determine an operational status of the image forming apparatus as it performs the operation. For example, a light sensor may determine that a light on the image forming apparatus has started to blink, indicating that the image forming apparatus is performing the operation. A printed page sensor may detect pages leaving the image forming apparatus, indicating the same. The sensors may further determine when the printer has finished performing the operation. The external sensors may send data indicative of the operational status to the host computing device, perhaps via one or more processors associated with the external sensors.

The host computing device may generate another log file based on this received data from the external sensors. It may then evaluate the image forming apparatus based on a comparison of the log file generated prior to installing the software update, and that generated post-update.

Since the systems and methods described herein may be more accurate and consistent than manual methods of evaluating printer performance, they may catch the slightly slower performance time where such manual methods may not. Further, such systems and methods may streamline and reduce costs of such troubleshooting an image forming apparatus. Other uses of the present disclosure will be readily apparent to those having skill in the art.

The present example should not be construed as limiting. The systems and methods described below may allow for evaluation of different image forming operations, using different combinations of external sensors, using more or fewer steps, or may be performed in different contexts than those presented in the example scenario. Such additional uses and applications of these systems and methods will be apparent to those having ordinary skill in the art.

II. System Examples

Figure 1:
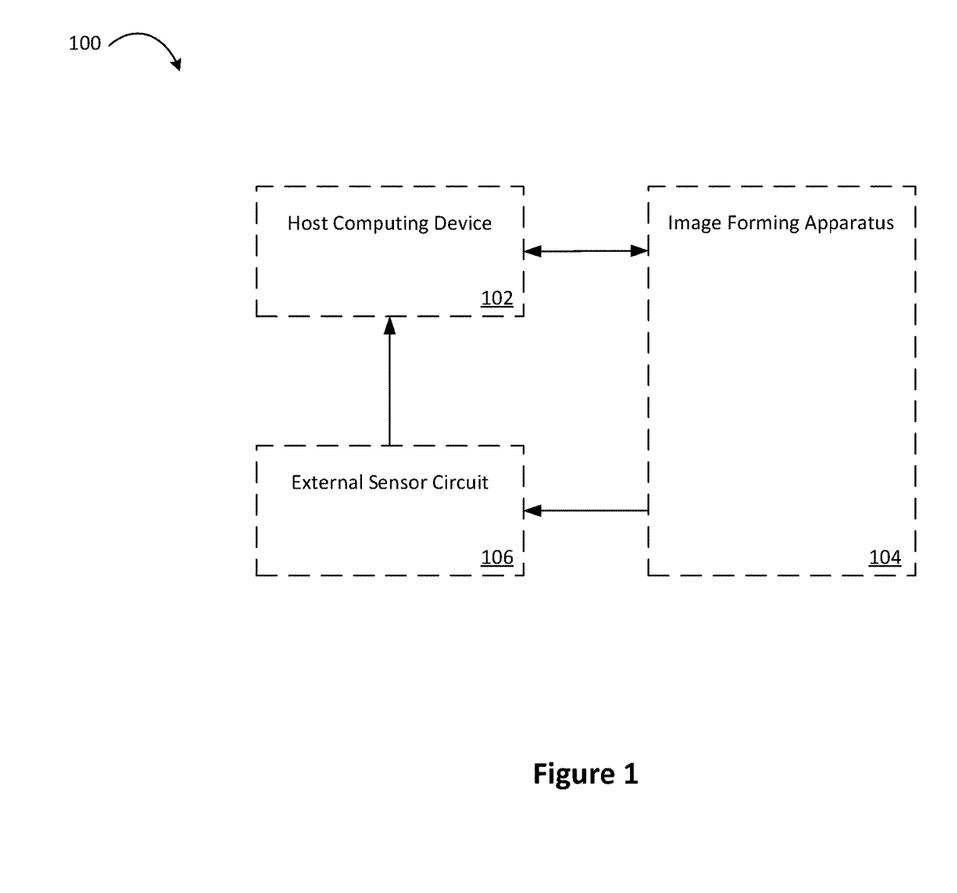
FIG. 1 is a schematic block diagram illustrating an image forming operation monitoring system, according to an example embodiment.

FIG. 1 is a schematic block diagram illustrating an image forming operation monitoring system 100 according to an example embodiment. The system includes a host computing device 102, an image forming apparatus 104, and an external sensor circuit 106. The host computing device 100 may be communicatively coupled to the image forming apparatus 104. For example, these devices may be directly coupled via a universal system bus (USB) connection. In other examples, they may be wirelessly coupled via a wireless access point. Other direct or wireless communicative coupling is possible as well, and will be readily ascertained by those having ordinary skill in the art. Further, though host computing device 100 and image forming apparatus 104 are depicted in FIG. 1 as being communicatively coupled, it should be understood that the disclosed systems and methods do not require such communicative coupling to monitor or evaluate performance of an image forming apparatus.

The host computing device 102 may send instructions to the image forming apparatus 104 The image forming apparatus 104 may perform an operation or operations in response to receiving the instructions. Further, the image forming apparatus 104 may send updates to the host computing device 102 indicative of a status of the image forming apparatus 104. For example, the image forming apparatus 104 may send a notification to the host computing device 100 indicating that the image forming apparatus 104 received instructions to perform the operation or operations. Other notifications or exchanges of data from the image forming apparatus to the host computing device 102 are possible as well.

The external sensor circuit 106 may be configured to detect an operational status of the image forming apparatus 104. For example, the external sensor unit 104 may include sensors that detect a blinking light of the image forming apparatus 104. The blinking light may indicate that the image forming apparatus is performing an image forming operation.

The external sensor circuit 106, in turn, may be configured to send data indicative of the detected operational status of the image forming apparatus 104 to the host computing device 102. The host computing device, based on this data, and perhaps further based on updates received from image forming apparatus 104, may evaluate the performance of the image forming apparatus.

Figure 2:
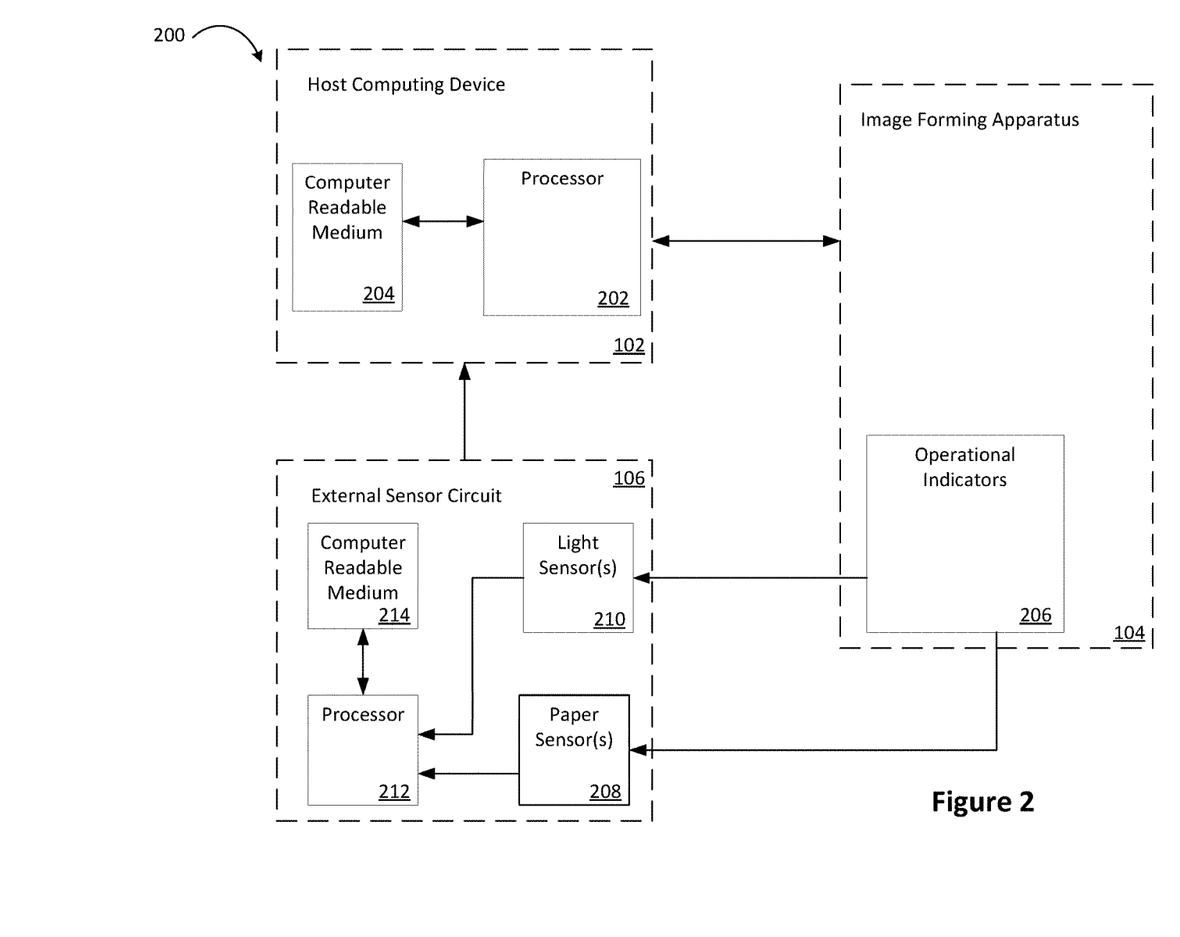
FIG. 2 is a schematic block diagram illustrating an image forming operation monitoring system, according to another example embodiment.

FIG. 2 is a schematic block diagram illustrating an image forming operation monitoring system 200, according to another example embodiment. In this example embodiment, the host computing device 102 may include a processor 202 and a computer readable medium 204. The processor 202 may include for example, a microprocessor. The computer-readable medium 204 may include, for example, random access memory, flash memory, and/or secure digital memory. Other types of processors and memories are possible as well. The computer readable medium 204, such as a non-transitory computer readable medium, may have instructions stored thereon that are executable by the processor 202 to perform steps. For example, processor 202 may execute the instructions to send the instructions, receive the updates, and/or receive the sensor data described above with regard to FIG. 1.

Image forming apparatus 104, may include operational indicators 206 that indicate that the image forming apparatus is performing an image forming operation, or indicate a status of performance of the operation. For example, the operational indicators 206 may include one or more indicator lights, such as a "busy" light emitting diode (LED) indicative of performance of the operation or an "attention" LED indicative, in some contexts, of an error occurring during performance of the operation. The operational indicators 206 may also include one or more printed page outputs on the image forming apparatus 104.

External sensor circuit 106 may also include a processor 212 that may execute instructions on a computer readable medium 214 to perform steps. For example, processor 212 may execute the instructions to detect the operational status of the image forming apparatus 104 or to send the data indicative of the detected operational status of the image forming apparatus 104 to the host computing device 102 as described above with regard to FIG. 1.

External sensor circuit 106 may further include one or more light sensors 208 within a single unitary device. The light sensors may be configured to detect a status of operational indicators 206, such as indicator lights of the image forming apparatus 104.

The system may further include one or more paper sensors 208. The one or more paper sensors 208 may be configured to detect a status of operational indicators 206, such as printed page outputs of the image forming apparatus 104. In the present example, the one or more paper sensors 208 may interface with the external sensor circuit 106 via processor 212. Throughout the detailed description, it should be understood that the external sensor circuit 106 may include one or more sensors external to the image forming apparatus 104 within a single unitary device, and may interface with one or more sensors external to both the external sensor circuit 106 and the image forming apparatus 104.

Figure 3:
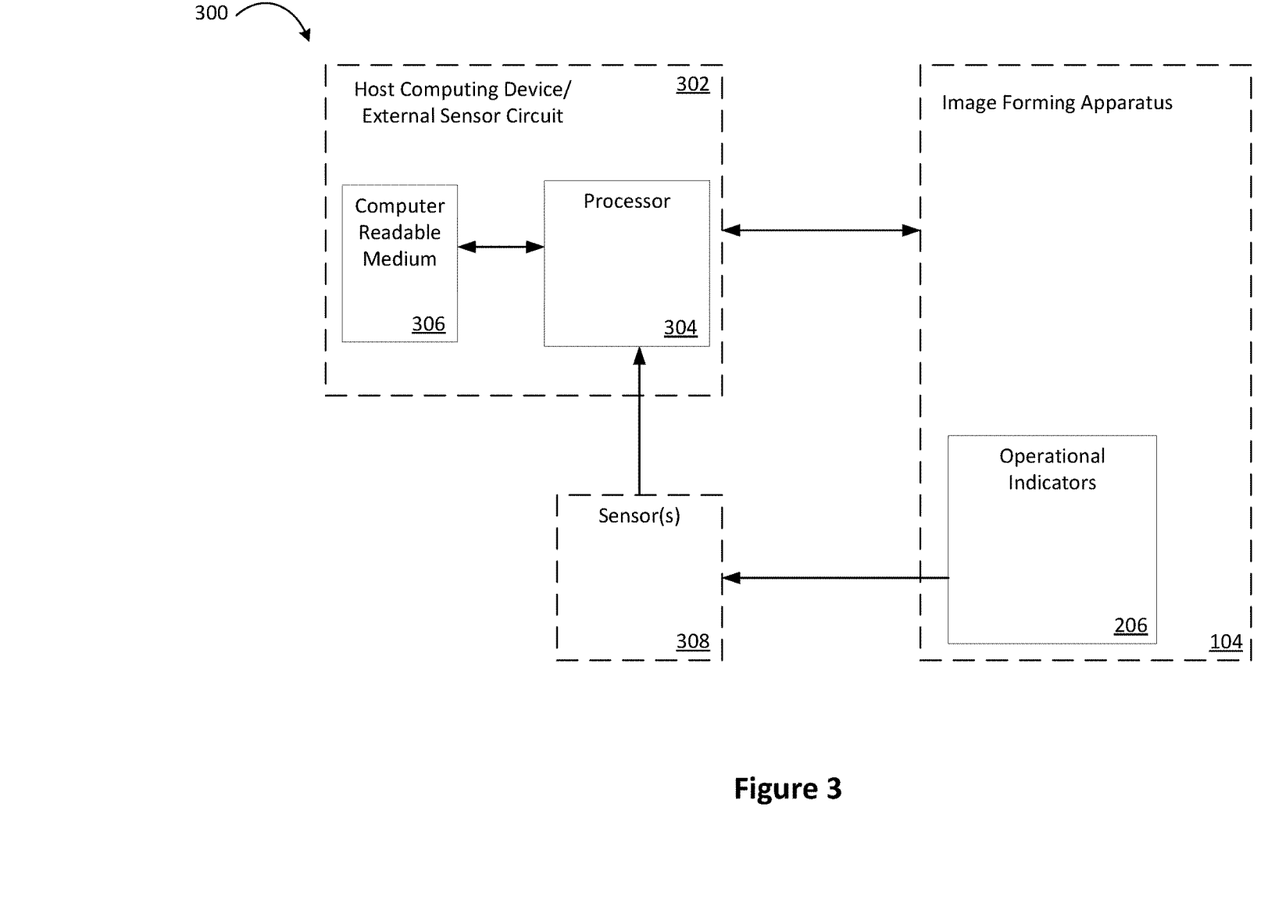
FIG. 3 is a schematic block diagram illustrating an image forming operation monitoring system, according to another example embodiment.

FIG. 3 is a schematic block diagram illustrating an image forming operation monitoring system 300, according to another example embodiment. In the present example, the host computing device and the external sensor circuit are included within a single unitary device. In this way, the host computing device/external sensor circuit 302 may perform the functions associated with both the host computing device 102 and external sensor circuit 106 as described above with regard to FIGS. 1 and 2. For example, processor 304 may execute instructions stored on computer readable medium 306 to send instructions to, and receive updates from, image forming apparatus 104, and detect a status of operational indicators 206, as described above with regard to FIGS. 1 and 2.

The system may further include one or more sensors 308 external to both the host computing device/external unit 302 and the image forming apparatus 104. Though in the present example each such sensor is illustrated as being included externally to the host computing device/external sensor circuit 302, it should be understood that, in alternative embodiments, the one or more sensors may be included within the host computing device/external sensor circuit 302. In still other embodiments, some of the one or more sensors may be included within host computing device/external sensor circuit 302, and others may be included externally to host computing device/external sensor circuit 302.

Figure 4:
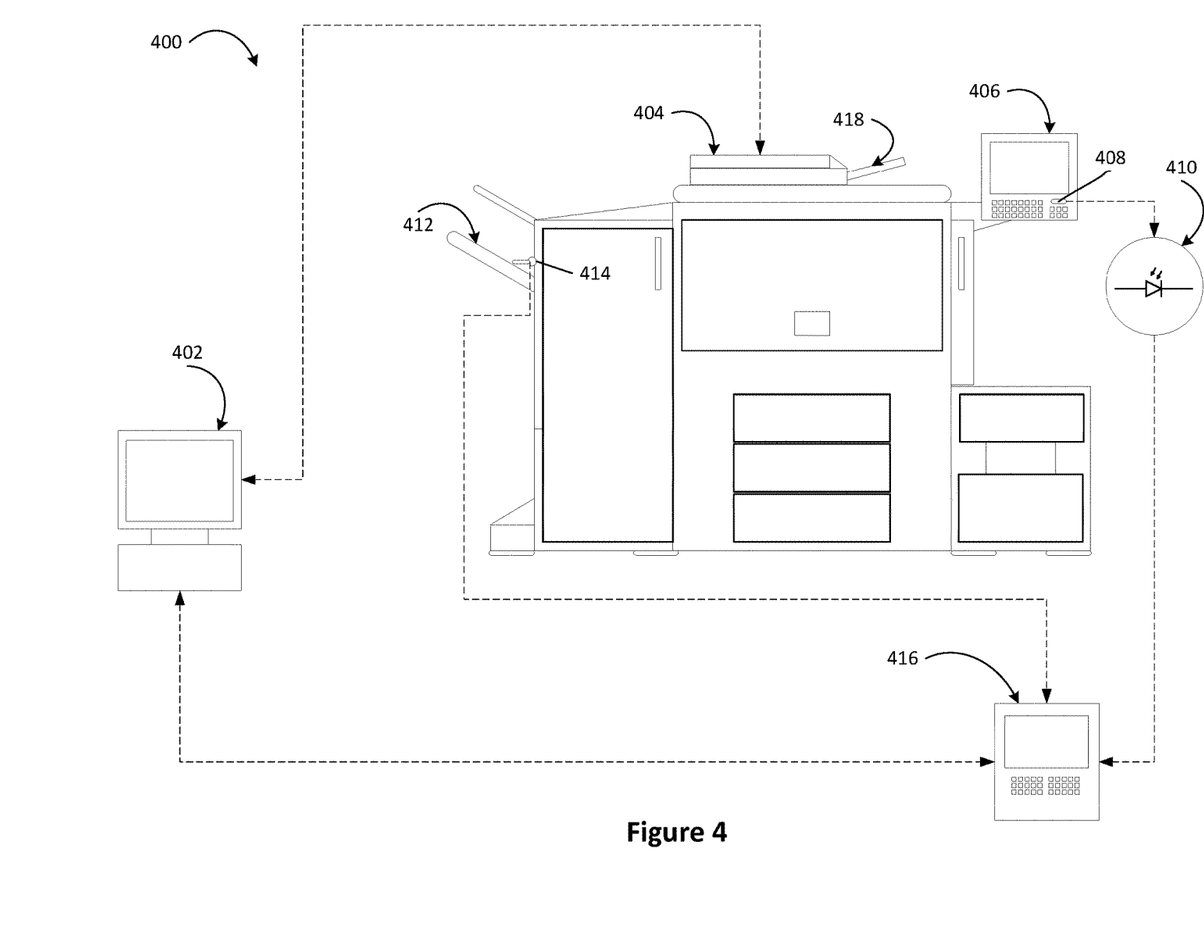
FIG. 4 is a simplified illustration of an image forming operation monitoring system, according to an example embodiment.

FIG. 4 is a simplified illustration of an image forming operation monitoring system 400, according to an example embodiment. The present example system includes host computing device 402, image forming apparatus 404, external sensor circuit 416, paper sensor 414 and light sensor 410.

As described above with regard to FIGS. 1, 2, and 3, the host computing device 402 may be communicatively coupled to the image forming apparatus 404, and may send instructions to perform an image forming operation to the image forming apparatus 404. In response, the image forming apparatus 404 may perform the operation.

In the present example, the image forming apparatus 404 includes monitor 406 that includes an indicator light 408, a printed page output 412, and a scanned/faxed page output 418. Each of these components of the image forming apparatus 404 may serve as an operational indicator of the image forming apparatus 404. In other embodiments, the image forming apparatus 404 may include additional or fewer components. For example the image forming apparatus 404 may simply include a printed page tray or a scanned page tray, or may include additional indicator lights.

Because various image forming apparatuses may include different operational indicators, the sensors used in the example embodiments described herein may be modular. For example, the system illustrated by FIG. 4 may readily accept an additional page sensor configured to detect scanned or faxed pages output at scanned/faxed page output 418. Such additional sensors may be able to interface with external sensor circuit 416.

Further, though page sensor 414 is used to detect printed pages at printed page output 412, the page sensor may be used differently in different contexts. For example, if placed at scanned/faxed page output 418, page sensor 414 may provide data that is interpreted differently by the external sensor circuit 416 and host computing device 402. For example, an expected performance time may be shorter for a scanning or faxing operation associated with scanned/faxed page output 418 than for printed page output 412.

In some embodiments, external sensor circuit 416 may simply include a means for interfacing with sensors 414 and 410 and means for communicating data received from the external sensors to host computing device 402. In other embodiments, external sensor circuit 416 may perform some processing of data received from sensors 414 and 410 prior to sending corresponding data to host computing device 402. Further, in some examples, external sensor circuit 416 may be a cellular phone or tablet device capable of interfacing with the sensors via hardware components on the device based on a software application stored thereon. In other examples, external sensor circuit 416 may be a standalone device such as that depicted in FIG. 4. In such examples, external sensor circuit 416 may include interactive features that allow a user to set, for example, which sensors are used, or specify a make and model of the image forming apparatus 404 to be monitored by the external sensor circuit 416. The external sensor circuit 416 may include a display that, among other information, displays a detected operational status of the image forming apparatus 404 based on data received from sensors 410 and 414. Other interactive features and display features are possible as well.

Figure 5:
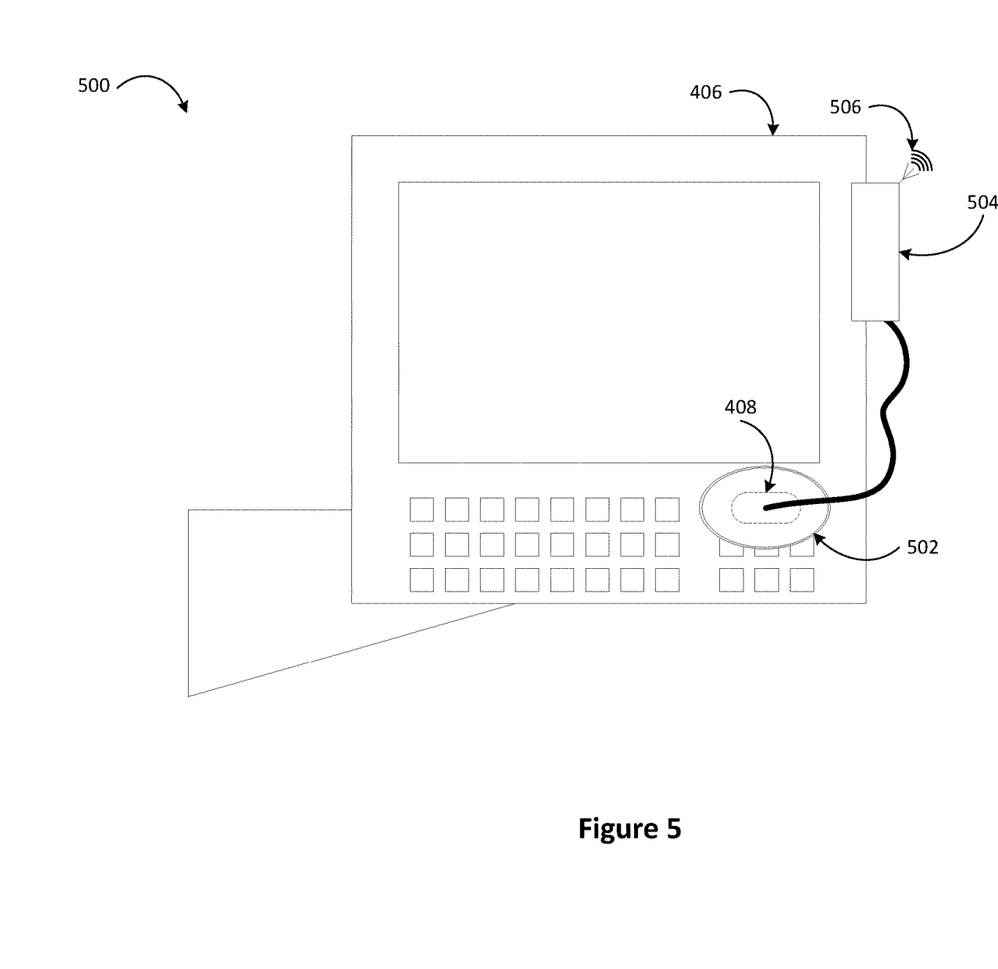
FIG. 5 is a simplified illustration of an external sensor of an image forming operation monitoring system, according to an example embodiment.

FIG. 5 is a simplified illustration of an external sensor of an image forming operation monitoring system 500, according to an example embodiment. In FIG. 4, light sensor 410 is depicted as a light-sensitive diode. The light-sensitive diode may be included within a light-sensitive transducer 502, which, for purposes of simplicity, shall be referred to as a light sensor. Light sensor 502 may alternatively or additionally include a photoresistor. Other light-sensitive components are possible as well.

Light sensor 502 may be additionally configured to interface with the external sensor circuits described about with regard to FIGS. 1 through 4, perhaps via one or more processors disposed within the light sensor 502 and a corresponding sensor circuit. For example, light sensor 502 may be communicatively coupled to an external sensor circuit directly, or wirelessly. The present example includes a communication terminal 504 and a transceiver 506. Such wireless communication may be achieved via a wireless access point, BLUETOOTH® communication, or ZIG-BEE® interface. Other wireless communication schemes are possible as well. Thus, light sensor 502 may detect light output by indicator light 408, perform preliminary processing on the detected light by a processor included within sensor 502, and communicate data representative of the detected light to an external sensor circuit via communication terminal 504 and transceiver 506.

Figure 6:
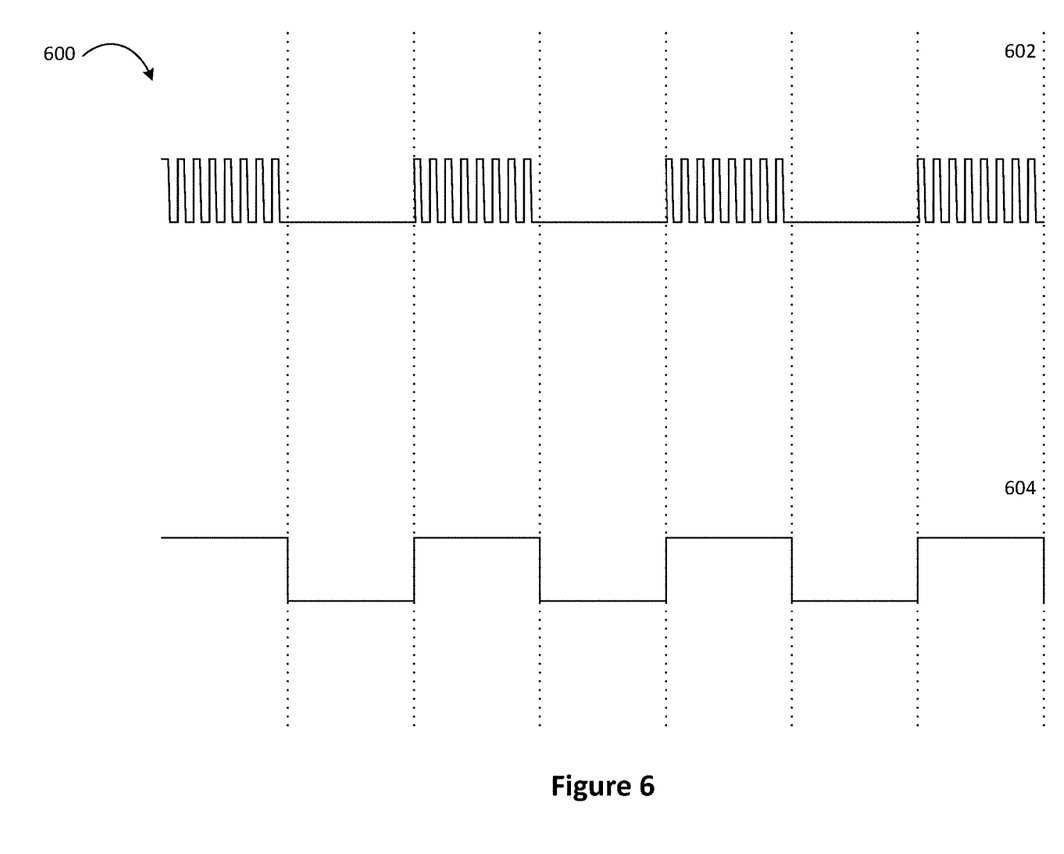
FIG. 6 is a simplified illustration of an input and output of an external sensor circuit of an image forming operation monitoring system, according to an example embodiment.

FIG. 6 is a simplified illustration of an input and output of an external sensor circuit of an image forming operation monitoring system 600, according to an example embodiment. Light sensor 502 described above may initially detect waveform 602. The waveform may result from a rapidly blinking indicator light, such as indicator light 408. The indicator light may blink imperceptibly to the human eye, and may blink several times during an "On" status of the light. As such, a processor associated with the light sensor 502 may determine an On/Off waveform 604 for transmission to an external sensor circuit. It should be understood that, while each sensor of the systems and methods descried herein may perform such processing prior to sending data to an external sensor circuit or host computing device, such processing may alternatively be performed by an external sensor circuit or host computing device.

Figure 7:
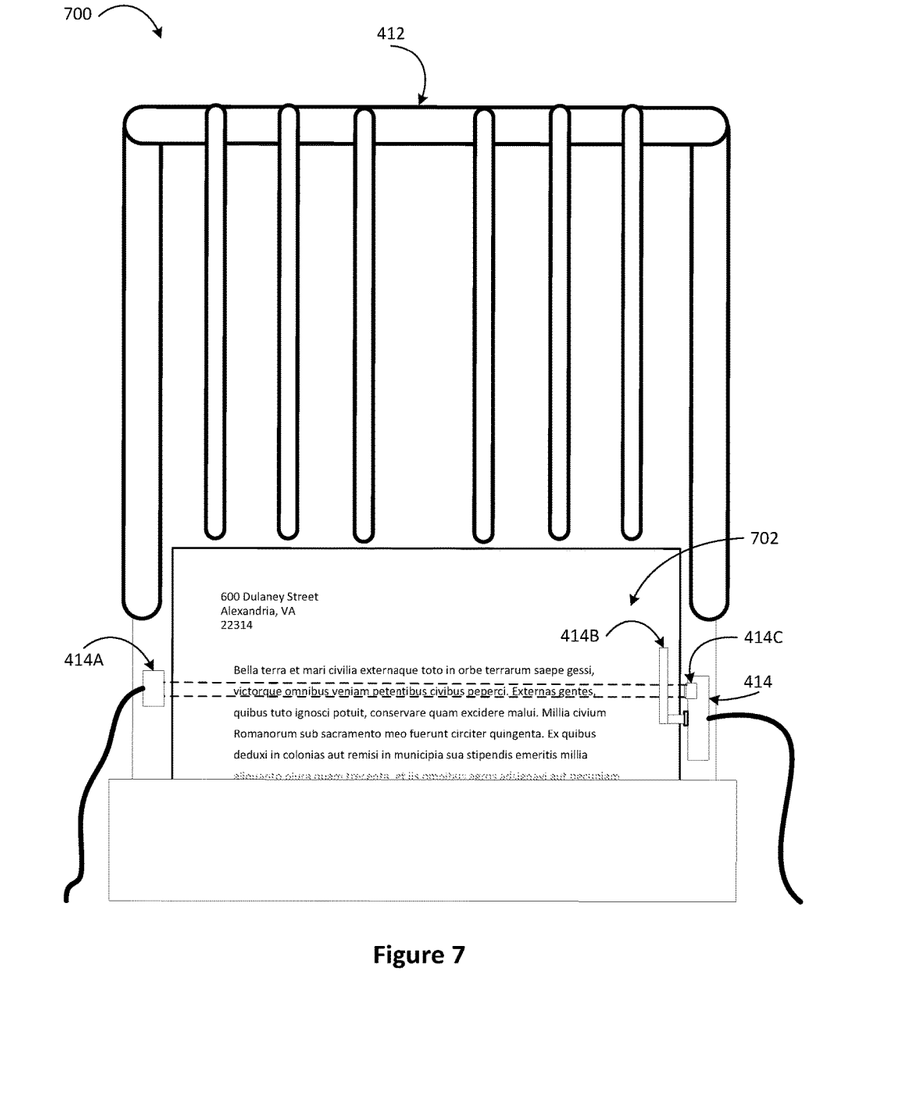
FIG. 7 is a simplified illustration of another sensor of an image forming operation monitoring system, according to an example embodiment.

FIG. 7 is a simplified illustration of another sensor of an image forming operation monitoring system 700, according to an example embodiment. In the present example, printed page sensor 414, as depicted in FIG. 4, may include a light source 414A, a mechanical light blocker 414B, and a light sensor 414C. As printed page 702 is output to printed page output 412, the mechanical light blocker 414B is moved, thereby allowing the light from light source 414A to pass to light sensor 414C. In other embodiments, such a printed page sensor may be implemented using a mechanical switch. Other example printed page sensors are possible as well. Further, as noted above, such a sensor may be used in different contexts and may be used as a modular component that is flexibly added to, or removed from, an image forming operation monitoring system.

III. Example Methods

Figure 8:
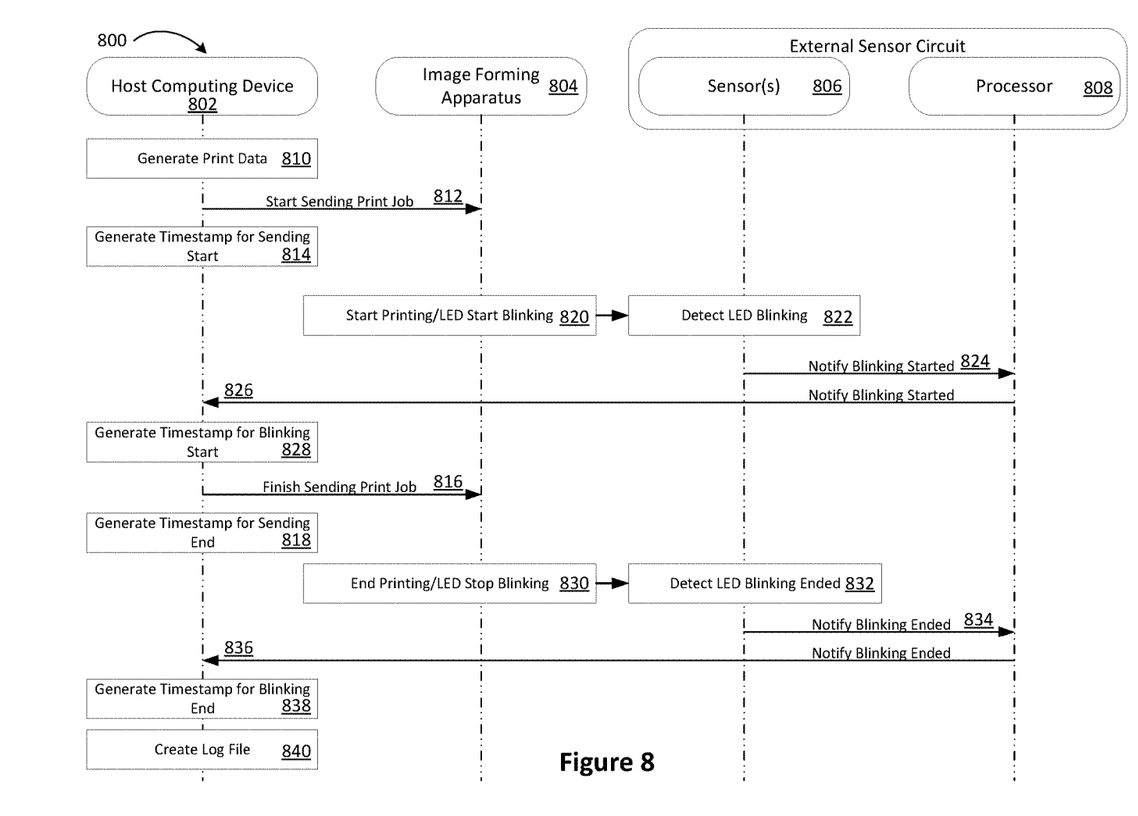
FIG. 8 is a flow chart illustrating an example method of monitoring an image forming operation.

FIG. 8 is a flow chart 800 illustrating an example method of monitoring an image forming operation. In the present example, the method is carried out by host computing device 802, image forming apparatus 804, and an external sensor circuit that includes one or more sensors 806 and a processor 808.

In the present example, at block 810, the host computing device 802 generates print data at block 810 and sends a print job to the image forming apparatus 804. At block 814, the host computing device 802 further generates a timestamp indicative of the time at which the host computing device 802 started to send the print job to the image forming apparatus 804. Once the host computing device has finished sending the print job, at block 818, the host computing device generates a timestamp indicative of having finished sending the print job. In some embodiments, such timestamps may be used to determine how effective the communication is between the host computing device 802 and the image forming apparatus 804. For example, the time elapsed between the timestamp indicative of starting to send the print job and the timestamp indicative of having sent the print job may be compared to an expected print job sending time.

At block 820, the image forming apparatus 804 starts to print responsive to receiving the print job. In the present example, an LED blinks to indicate that the printing operation has started. At block 822, the one or more sensors 806 detect the blinking LED, and notify the processor 808 of the external sensor circuit that the LED has started to blink. The processor 808, in turn, notifies the host computing device 802 of the same.

At block 828, responsive to being notified that the LED has started blinking, the host computing device 802 generates a timestamp indicative of the LED starting to blink, and, accordingly, indicative of the image forming apparatus 804 starting to perform the printing operation.

At block 830, the image forming apparatus 804 finishes the print job. Accordingly, the LED stops blinking. At block 832, the one or more sensors 806 detect that the blinking LED has stopped, and notify the processor 808 of the external sensor circuit that the LED has stopped blinking. The processor 808, in turn, notifies the host computing device 802 of the same.

At block 838, responsive to being notified that the LED has stopped blinking, the host computing device generates a timestamp indicative of the LED ceasing to blink, and, accordingly, indicative of the image forming apparatus 804 having completed the printing operation.

At block 840, host computing device generates a log file. The log file may include each of the timestamps generated during the printing operation process. The host computing device 802 may additionally compare the generated log file to past logs files, or exemplary log files that contain different timestamps indicative of an expected printing operation completion time. The host computing device 802 may compare these timestamps to evaluate performance of the printing operation.

As noted above, the timestamps associated with blocks 810 and 814 may be used to determine a performance level associated with sending the print job from the host computing device 802 to the image forming apparatus 804. However, in other embodiments, the timestamps associated with blocks 828 and 838 may be used to evaluate performance of the printing operation, since such data may more accurately represent how the image forming apparatus 804 executes instructions once they are received. In still other embodiments, each timestamp may be used to evaluate an overall performance level of the image forming apparatus 804.

The flow chart depicted in FIG. 8 could be performed iteratively to determine a more comprehensive evaluation of the image forming apparatus 804. For example, the host computing device 802 could successively generate print data and send a plurality of print jobs to the image forming apparatus. Such print jobs may vary in page number, or ink usage. As such, instructions from host computing device 802 to execute the operation of the image forming apparatus 804 may include a plurality of print jobs to be executed by the image forming apparatus in succession.

Evaluating performance of an image forming operation may simply include determining whether the image forming operation was performed within an expected operation execution time. However, in other examples, the total time between starting to send the image forming operation instructions and completion of the image forming operation may be used. In still other examples, a total time to perform a series of image forming operations may be used.

The host computing device may perform an action responsive to evaluating performance of the image forming operation. For example, responsive to determining that the image forming apparatus has not performed an image forming operation within an expected operation execution time, the host computing device may flag the image forming apparatus for maintenance. In other examples, the host computing device may cause the image forming apparatus to revert to an earlier firmware or software installation. In still other examples, the host computing device may send instructions to perform particular image forming operations to the image forming apparatus. For instance, upon determining that the image forming apparatus has not performed a printing operation within an expected printing operation execution time, the host computing device may send instructions to perform the same printing operation. Other examples of actions taken in response to determining that the image forming apparatus has not performed an image forming operation within an expected operation execution time are possible as well.

Figure 9:
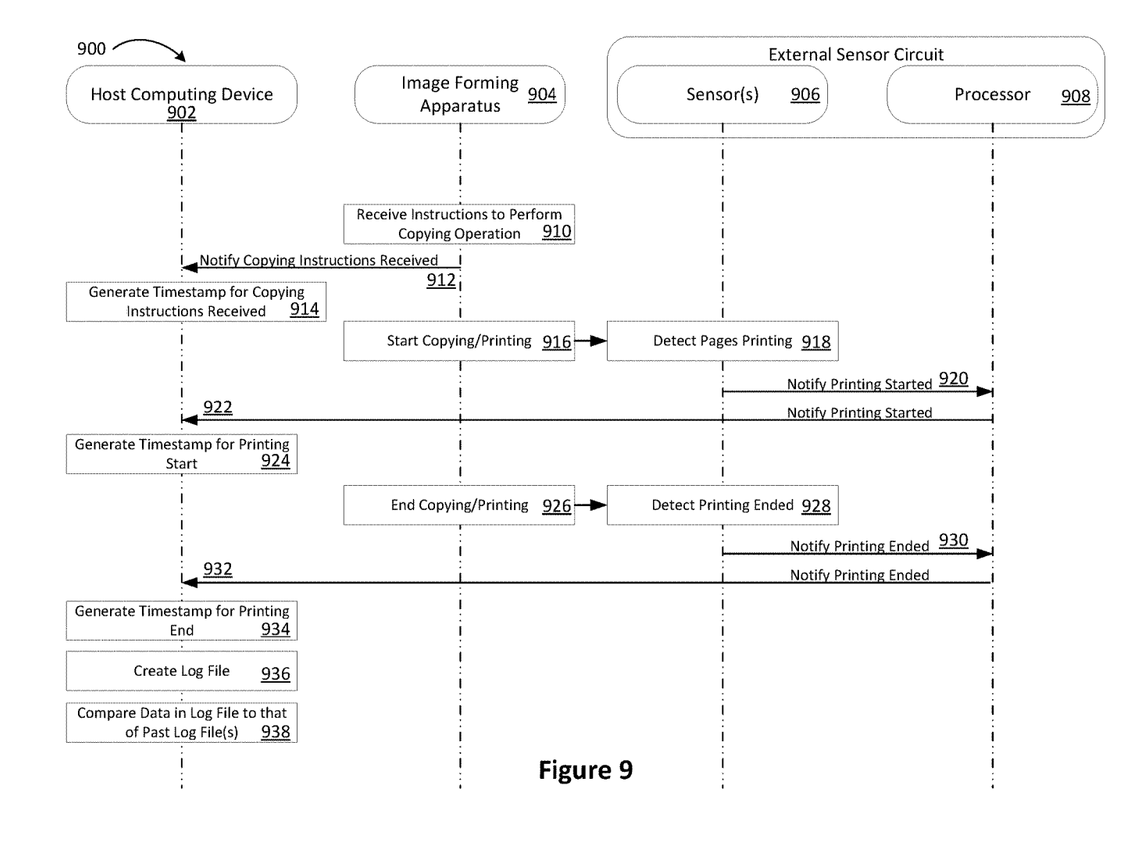
FIG. 9 is a flow chart illustrating another example method of monitoring an image forming operation.

FIG. 9 is a flow chart 900 illustrating another example method of monitoring an image forming operation. In the present example, the method is carried out by host computing device 902, image forming apparatus 904, and an external sensor circuit that includes one or more sensors 906 and a processor 908. However, in the present example, the image forming operation being monitored is a copying operation. As such, the method and system components operate differently in the present example than in that describe above with regard to FIG. 8.

For example, at block 910, the image forming apparatus 904 receives instructions to perform the copying operation. These instructions are not necessarily sent by host computing device 902. Rather, the instructions may be input via user interface 406 as depicted in FIGS. 4 and 5. Indeed, it should be understood that, regardless of the image forming operation type, such instructions may be received from any number of sources other than the host computing device 902. For example, the instructions may be received from a portable memory device, such as a flash drive, or from any client device within a network environment shared by the image forming apparatus 904.

In the present example, after receiving the instructions to perform the copying operation, the system may monitor and evaluate performance of the copying operation in much the same way described above with regard to FIG. 8. However, it should be understood that different combinations of sensors may be used to detect performance of the copying operation than those used to detect performance of the printing operation described above. In some examples, the same combination of sensors may be used for both printing operations and copying operations. Further, the timestamps associated with blocks 914, 924, and 934 may be evaluated differently than those associated with blocks 810, 814, 828, and 838 of FIG. 8. For example, an expected copying operation completion time may be different than an expected printing operation completion time; even if the information received for a printing operation is substantially similar to the information received for the copying operation.

Figure 10:
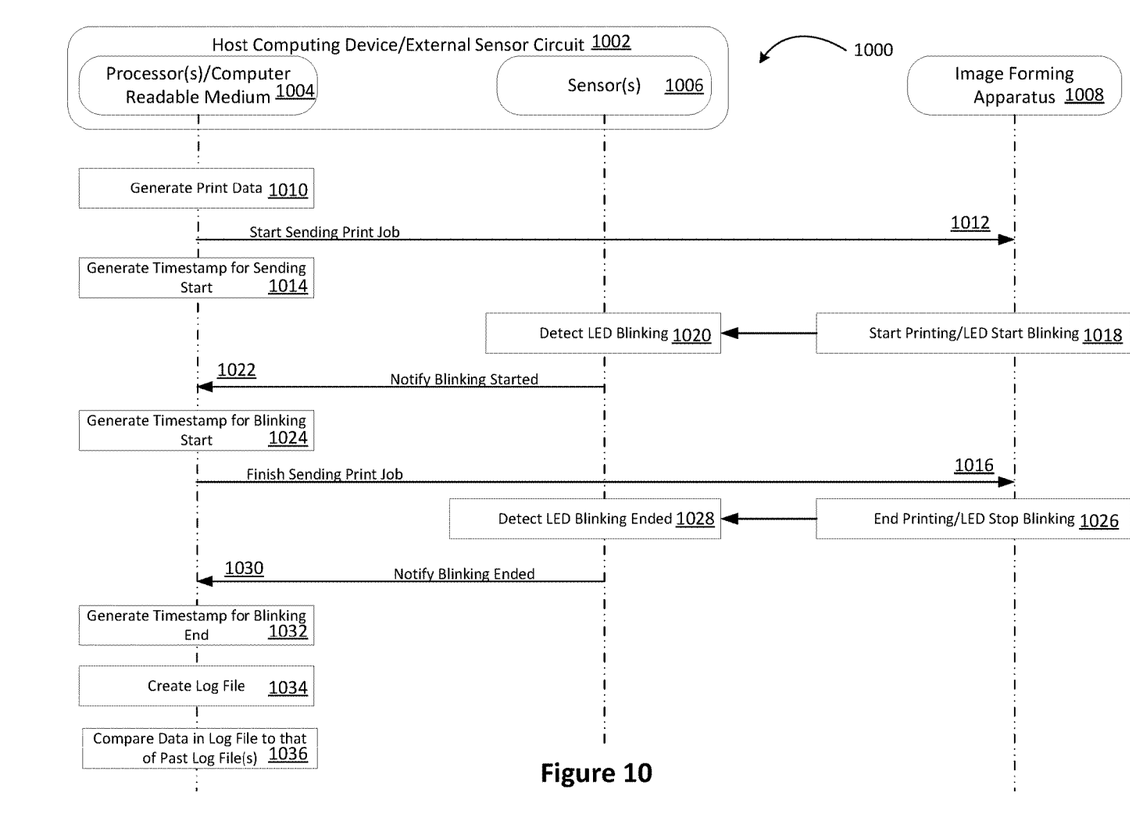
FIG. 10 is a flow chart illustrating another example method of monitoring an image forming operation.

FIG. 10 is a flow chart 1000 illustrating another example method of monitoring an image forming operation. In the present example, the method is carried out by host computing device/external sensor circuit 1002, which includes one or more processors 1004 and sensors 1006, and image forming apparatus 1008. The method illustrated in the present example is substantially the same as that illustrated above with regard to FIG. 8, except that the various steps of sending data from the external sensor circuit to host computing device 802 are no longer necessary.

It should be understood that FIGS. 8, 9, and 10 are provided for illustrative purposes only and should not be construed as limiting. Though only methods of monitoring printing operations and copying operations have been described, scanning, faxing, or other image forming operations may be monitored using similar steps and system component configurations.

Figure 11:
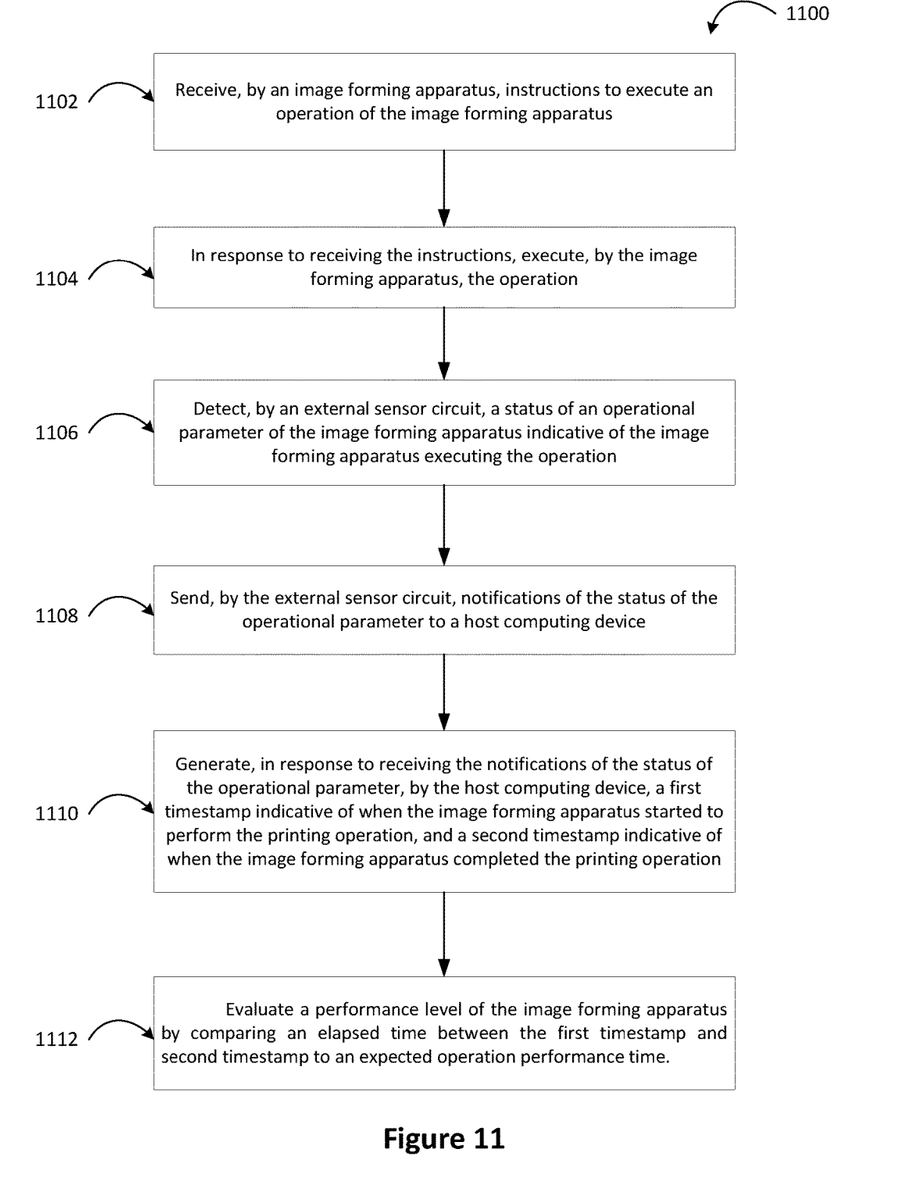
FIG. 11 is a block diagram illustrating a method of monitoring an image forming operation.

FIG. 11 is a block diagram 1100 illustrating a method of monitoring an image forming operation. In some examples, the method may be carried out as part of a system. For example, block 1102 may be carried out by an image forming apparatus in conjunction with one or more processors associated with the image forming apparatus.

In other examples, the method may be carried out as part of a computing system. In these examples, a non-transitory computer readable medium may store instructions executable by one or more processors associated with the computing system to cause the computing system to perform the blocks of the method.

Block 1102 of the method may be performed to receive, by an image forming apparatus, instructions to execute an operation of the image forming apparatus. For example, as depicted in FIG. 8, the image forming apparatus may receive instructions to perform a print job.

Block 1104 of the method may be performed to, in response to receiving the instructions, execute, by the image forming apparatus, the operation. For example, as depicted in FIG. 8, the image forming apparatus may start printing responsive to receiving the print job.

Block 1106 of the method may be performed to detect, by an external sensor circuit, a status of an operational parameter of the image forming apparatus indicative of the image forming apparatus executing the operation. For example, as depicted in FIG. 8, in response to receiving the print job, an LED of the image forming apparatus may start to blink to indicate that the image forming apparatus is performing the printing operation. Further, as depicted, an external sensor circuit may detect an On/Off status of the LED blinking.

Block 1108 of the method may be performed to send, by the external sensor circuit, notifications of the status of the operational parameter to a host computing device. For example, as depicted in FIG. 8, responsive to detecting the On/Off status of the LED blinking and ceasing to blink, the external sensor circuit may send notifications to a host computing device that the image forming apparatus has started to perform the printing operation, and completed performing the printing operation.

Block 1110 of the method may be performed to generate, in response to receiving the notifications of the status of the operational parameter, by the host computing device, a first timestamp indicative of when the image forming apparatus started to perform the printing operation, and a second timestamp indicative of when the image forming apparatus completed the printing operation. For example, as depicted in block 828 of FIG. 8, the host computing device may generate a timestamp indicative of a time when the LED started to blink, and, accordingly, when the image forming apparatus started to perform the printing operation. Further, as depicted in block 838 of FIG. 8, the host computing device may generate a timestamp indicative of a time when the LED stopped blinking, and, accordingly, when the image forming apparatus completed the printing operation.

Though the method depicted by FIG. 11 has been described by the exemplary flow chart depicted in FIG. 8, it should be understood that the steps of FIG. 11 are equally representative of the flow charts depicted in FIGS. 9 and 10. Further, the steps of FIG. 11 may be carried out by any combination of system components described throughout the detailed description.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A method comprising:
   receiving, by an image forming apparatus, instructions to execute an operation of the image forming apparatus;
   in response to receiving the instructions, executing, by the image forming apparatus, the operation;
   detecting, by an external sensor circuit, a status of an operational parameter of the image forming apparatus indicative of the image forming apparatus executing the operation;
   sending, by the external sensor circuit, notifications of the status of the operational parameter to a host computing device;
   generating, in response to receiving the notifications of the status of the operational parameter, by the host computing device, a first timestamp indicative of when the image forming apparatus started to execute the printing operation, and a second timestamp indicative of when the image forming apparatus completed the printing operation; and
   evaluating a performance level of the image forming apparatus by comparing an elapsed time between the first timestamp and second timestamp to an expected operation execution time.

2. The method of claim 1, wherein the operation of the image forming apparatus comprises a printing operation.

3. The method of claim 1, wherein the operation of the image forming apparatus comprises a copying operation.

4. The method of claim 1, further comprising sending, by the image forming apparatus, a notification indicative of the image forming apparatus having received the instructions and receiving, by the host computing device, the notification.

5. The method of claim 1, wherein the operational parameter of the image forming apparatus comprises an indicator light of the image forming apparatus, and wherein detecting the operational status of the operational parameter comprises sensing an On/Off state of the indicator light.

6. The method of claim 1, wherein the operational parameter of the image forming apparatus comprises a printed sheet output of the image forming apparatus, and wherein detecting the status of the operational parameter comprises sensing that a printed sheet has been output from the image forming apparatus.

7. The method of claim 6, wherein evaluating the performance of the image forming apparatus comprises generating, by the host computing device, a log file, wherein the log file comprises data indicative of the first and second timestamps generated by the host computing device, and wherein comparing the elapsed time between the first timestamp and second timestamp to the expected operation execution time comprises comparing the data from the generated log file to one or more timestamps indicative of a sensed printed sheet from at least one previously generated log file.

8. The method of claim 1, wherein evaluating the performance of the image forming apparatus comprises generating, by the host computing device, a log file, wherein the log file comprises data indicative of the first and second timestamps generated by the host computing device, and wherein comparing the elapsed time between the first timestamp and second timestamp to the expected operation execution time comprises comparing the data from the generated log file to data from at least one previously generated log file.

9. The method of claim 1, further comprising sending, by the host computing device, the instructions to execute the operation of the image forming apparatus received by the image forming apparatus.

10. The method of claim 1, wherein the instructions to execute the operation of the image forming apparatus comprise a plurality of print jobs to be executed by the image forming apparatus in succession.

11. An image forming operation monitoring system comprising:
an image forming apparatus configured to execute an operation in response to receiving instructions to execute the operation;
an external sensor circuit comprising one or more sensors and a processor, wherein the one or more sensors are configured to detect a status of an operational parameter of the image forming apparatus indicative of the image forming apparatus executing the operation, and wherein the processor is configured to send notifications of the status of the operational parameter; and
a host computing device, wherein the host computing device is configured to generate, in response to receiving the notifications of the status of the operational parameter, a first timestamp indicative of when the image forming apparatus started to execute the printing operation, and a second timestamp indicative of when the image forming apparatus completed the printing operation, wherein the host computing device is further configured to generate a log file, wherein data of the log file comprises the first timestamp and the second timestamp, and is indicative of how quickly the image forming apparatus executed the operation.

12. The image forming operation monitoring system of claim 11, wherein the one or more sensors of the external sensor circuit comprise a light-sensitive transducer operable to sense an On/Off state of an indicator light of the image forming apparatus.

13. The image forming operation monitoring system of claim 11, wherein the one or more sensors of the external sensor circuit comprise a motion-sensitive transducer operable to sense a sheet being output by the image forming apparatus.

14. The image forming operation monitoring system of claim 11, wherein the host computing device is further configured to send the instructions to execute the operation of the image forming apparatus.

15. The image forming operation monitoring system of claim 14, wherein the instructions to execute the operation of the image forming apparatus comprise a plurality of print jobs to be executed by the image forming apparatus in succession.

16. The image forming operation monitoring system of claim 11, wherein the host computing device is further configured to compare the data of the generated log file to data of at least one previously generated log file.

17. The image forming operation monitoring system of claim 11, wherein the host computing device and the external sensor circuit are comprised within a single unitary device.

18. A non-transitory computer-readable medium having instructions stored thereon that, upon execution by at least one processor, cause an image forming operation monitoring system to perform steps comprising:
receiving, by an image forming apparatus, instructions to execute an operation of the image forming apparatus;
in response to receiving the instructions, executing, by the image forming apparatus, the operation;
detecting, by an external sensor circuit, a status of an operational parameter of the image forming apparatus indicative of the image forming apparatus executing the operation;
sending, by the external sensor circuit, notifications of the status of the operational parameter to a host computing device;
generating, in response to receiving the notifications of the status of the operational parameter, by the host computing device, a first timestamp indicative of when the image forming apparatus started to execute the printing operation, and a second timestamp indicative of when the image forming apparatus completed the printing operation; and
evaluating a performance level of the image forming apparatus by comparing an elapsed time between the first timestamp and second timestamp to an expected operation execution time.

19. The non-transitory computer-readable medium of claim 18, wherein the operation of the image forming apparatus comprises a printing operation.

20. The non-transitory computer-readable medium of claim 18, wherein the steps further comprise sending, by the image forming apparatus, a notification indicative of the image forming apparatus having received the instructions and receiving, by the host computing device, the notification.

* * * * *